(12) United States Patent
Islam et al.

(10) Patent No.: US 7,898,139 B2
(45) Date of Patent: Mar. 1, 2011

(54) VARIABLE EFFORT STEERING ACTUATOR

(75) Inventors: Mohammad S. Islam, Saginaw, MI (US); Joel E. Birsching, Vassar, MI (US); Tomy Sebastian, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 0 days.

(21) Appl. No.: 12/187,722

(22) Filed: Aug. 7, 2008

(65) Prior Publication Data

US 2009/0050398 A1 Feb. 26, 2009

Related U.S. Application Data

(60) Provisional application No. 60/957,114, filed on Aug. 21, 2007.

(51) Int. Cl.
*H02K 1/06* (2006.01)
*H02K 49/00* (2006.01)
*H02K 49/02* (2006.01)

(52) U.S. Cl. .............. 310/216.069; 310/103; 310/105; 310/110; 310/216.07; 310/216.071; 310/216.072; 310/216.073

(58) Field of Classification Search .......... 310/49, 310/77, 92, 154, 158, 184, 156.32–156.35, 310/216.069–216.072, 216.092, 266; 192/84
See application file for complete search history.

(56) References Cited

U.S. PATENT DOCUMENTS 2,320,721 A * 6/1943 Ericson ................. 74/574.1
2,837,670 A * 6/1958 Thomas et al. ........... 310/49.43
3,602,749 A * 8/1971 Esters ................... 310/154.21
5,119,898 A * 6/1992 Eckhardt et al. ........... 180/422
5,454,439 A 10/1995 Birsching

FOREIGN PATENT DOCUMENTS

EP 1209061 A2 5/2002
EP 2006982 A2 12/2008

OTHER PUBLICATIONS

European Office Action and Search Report dated Oct. 21, 2009 for European Application No. 08161393.7-1264/2028081.

* cited by examiner

*Primary Examiner*—Quyen Leung
*Assistant Examiner*—Jose A Gonzalez Quinones
(74) *Attorney, Agent, or Firm*—Cantor Colburn LLP

(57) ABSTRACT

A magnetic actuator, comprising, an inner ring, an outer ring disposed around the inner ring, a first pair of inner teeth disposed on the inner ring that partially define a gap between the first pair of inner teeth having a first angular dimension, a second pair of inner teeth disposed on the inner ring that partially define a gap between the second pair of inner teeth having a second angular dimension, a first pair of outer teeth disposed on the outer ring that partially define a gap between the first pair of outer teeth having a third angular dimension and a second pair of outer teeth disposed on the outer ring that partially define a gap between the second pair of outer teeth having a fourth angular dimension.

11 Claims, 3 Drawing Sheets

VARIABLE EFFORT STEERING ACTUATOR

CROSS-REFERENCE TO RELATED APPLICATIONS

This application claims the benefit of U.S. Provisional Application No. 60/957,114 filed Aug. 21, 2007.

BACKGROUND

This application relates to power steering systems, and more particularly, to magnetic actuators for use with variable effort power steering systems.

For example, power steering systems in motor vehicles, etc. are designed to provide appropriate hydraulic or electrical assist to allow a driver to complete a turn of the motor vehicle. The driver applies a steering input through a steering wheel that is rotationally connected to a first shaft. The first shaft is rotationally coupled to a second shaft that is, in turn, connected to a steering mechanism. The first and second shafts are torque transmittingly coupled together by a compliant member, such as a torsion bar. The torsion bar allows the first shaft to rotate with respect to the second shaft by a predetermined number of degrees, e.g., +/−12 degrees. Mechanical stops prevent further movement. The amount of steering assist applied to the steering mechanism is determined as a function of the degree of torsional strain or movement in the torsion bar.

An exemplary power steering system is a hydraulic variable effort steering device having a proportional control valve and a magnetic actuator for varying the effective compliance of the torsion bar. The proportional control valve includes a valve spool connected to a manual steering wheel, a valve body connected to wheels of the vehicle, and a torsion bar between the valve spool and the valve body. Throttling orifices are positioned between the valve body and the valve spool to regulate a steering assist boost pressure when the valve spool is rotated relative to the valve body from the center position by manual effort at the steering wheel. As a result, a centering torque in the torsion bar is induced to effect a tactile response for the driver in the steering wheel. The magnetic actuator includes permanent magnets arranged around a ring that is attached to the valve spool. It also includes a pole piece attached to the valve body having outer pole teeth outside of the magnetic ring, inner pole teeth inside of the magnetic ring, and an exciting coil magnetically coupled to the pole teeth. The inner teeth and outer teeth are connected by a non-magnetic portion so that the inner teeth and outer teeth are magnetically decoupled. A current can be applied to the exciting coil to induce an electromagnetic torque between the pole piece and the permanent magnetic ring and thus increase or decrease the effective torque of the torsion bar depending on the direction of the current flowing through the coil.

The arrangement and shape of the teeth in current magnetic actuators are often altered to achieve a desired torque. The teeth in current magnetic actuators are arranged in groups. In some cases, the teeth in each group are profiled differently, the inner teeth and the outer teeth are mis-aligned, and/or the arrangement of the groups of teeth around the magnetic ring is asymmetrical. Additionally, the magnetic actuators are often larger in size than desired due to magnet utilization being poor. As a result of these design specifications, current magnetic actuators can be difficult and expensive to manufacture.

It is therefore desirable to develop an improved magnetic actuator that is smaller in size and easier to manufacture.

SUMMARY

Magnetic actuators for use in power steering systems are described herein. According to an embodiment, a magnetic actuator, comprising, an inner ring, an outer ring disposed around the inner ring, a first pair of inner teeth disposed on the inner ring that partially define a gap between the first pair of inner teeth having a first angular dimension, a second pair of inner teeth disposed on the inner ring that partially define a gap between the second pair of inner teeth having a second angular dimension, a first pair of outer teeth disposed on the outer ring that partially define a gap between the first pair of outer teeth having a third angular dimension and a second pair of outer teeth disposed on the outer ring that partially define a gap between the second pair of outer teeth having a fourth angular dimension.

According to an alternate embodiment, a magnetic actuator, comprising, an inner ring, an outer ring disposed around the inner ring, a first pair of inner teeth disposed on the inner ring that partially define a gap between the first pair of inner teeth having a first angular dimension, a third tooth disposed on the inner ring that includes a first notch partially defined by the third tooth, a first pair of outer teeth disposed on the outer ring that partially define a gap between the first pair of outer teeth having a second angular dimension, and a fourth tooth disposed on the outer ring that includes a second notch partially defined by the fourth tooth.

BRIEF DESCRIPTION OF THE DRAWINGS

Referring now to the figures, which are meant to be exemplary, not limiting, and wherein the like elements are numbered alike.

DETAILED DESCRIPTION OF EXEMPLARY EMBODIMENTS

Electromagnetic actuators for use in power steering systems such as variable effort steering (VES) systems are disclosed. It its contemplated that the magnetic actuators could be used in other applications as well such as torque overlay, park assist, lane maintaining, lead pull compensation, vehicle stability, and torque nudge. The magnetic actuators are designed to improve their robustness and efficiency in achieving a desired torque by optimizing the use of the magnets therein. As such, the electromagnetic actuators are very compact and smaller in size than current electromagnetic actuators. Moreover, the magnetic actuators can be manufactured fairly easily. This ease of manufacture combined with the small size of the actuators make them less expensive to manufacture.

Figure 1:
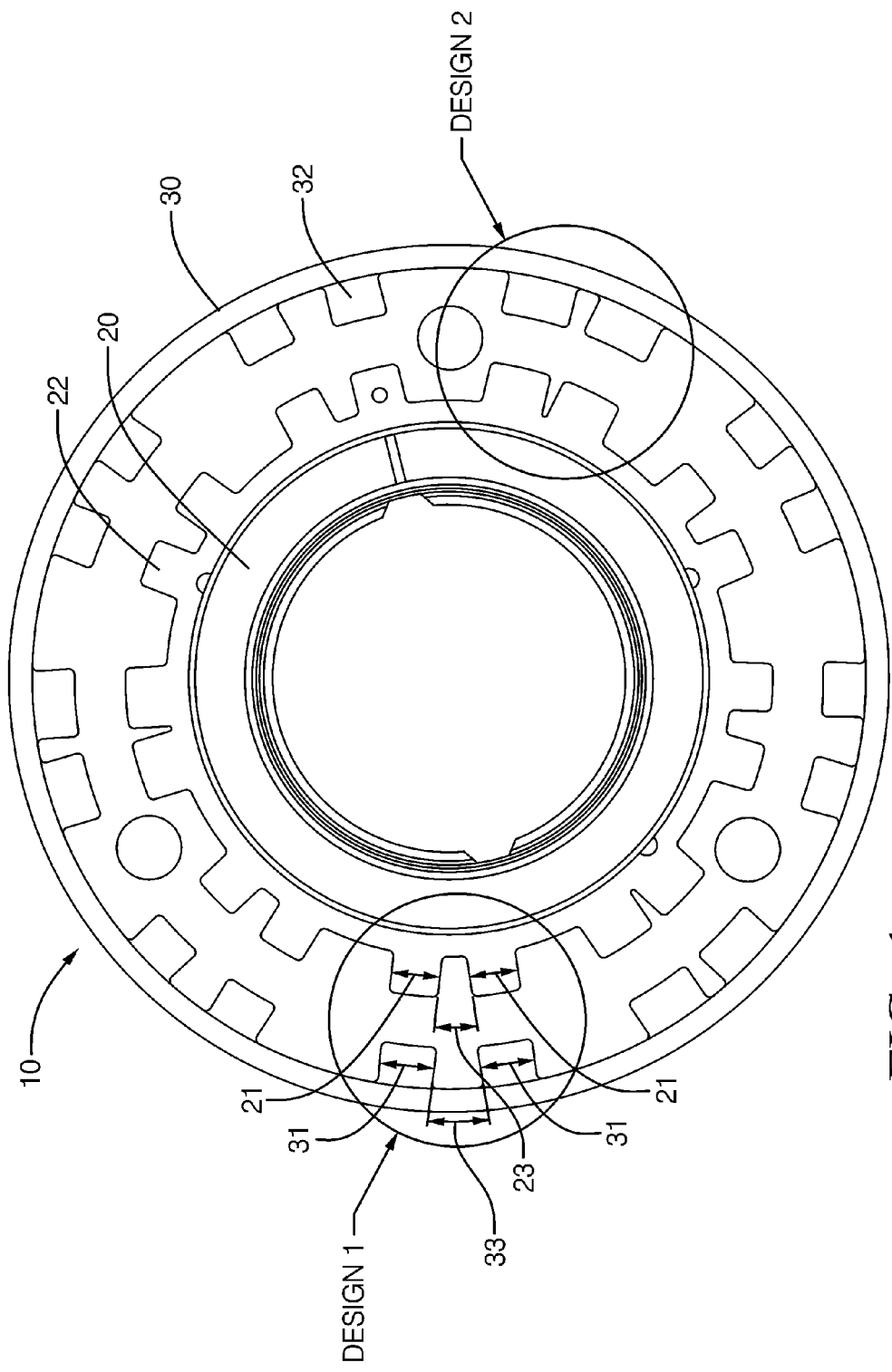
FIG. 1 is a top plan view of an exemplary embodiment of a magnetic actuator having a unique tooth design.

FIG. 1 illustrates an exemplary embodiment of a magnetic actuator 10. The actuator 10 includes a magnetic ring (shown later) interposed between an inner ring 20 and an outer ring 30. Inner pole teeth 22 are arranged in groups of two radially about the outer circumference of inner ring 20. The groups of inner pole teeth 22 are distributed equidistantly and symmetrically around inner ring 20. The inner pole teeth 22 extend in an outward direction toward outer ring 30. Additionally, outer pole teeth 32 are arranged in groups of two radially about the inner circumference of outer ring 30. The outer pole teeth 32 extend in an inward direction toward inner ring 20. The outer pole teeth 32 are equidistantly distributed around outer ring 32 such that they are aligned to inner pole teeth 22. The inner and outer pole teeth 22, 32 are all the same height, which contributes to the ease with which they are manufactured. However, the inner pole teeth 22 and the outer pole teeth 32 have different widths. In the embodiment shown in FIG. 1, the outer pole teeth 32 are wider than the inner pole teeth 22. The dimension of the width of the outer pole teeth 32 is shown as dimension 31 while the dimension of the width of the inner pole teeth 22 is shown as dimension 21. It is contemplated that the total number of teeth and the number in each group of inner and outer pole teeth 22, 32 could vary depending on the design parameters of the magnetic actuator 10.

The inner ring 20, the outer ring 30, the inner pole teeth 22, and the outer pole teeth 32 arranged thereon include a magnetic material suitable for conducting magnetic flux upon application of an electric current. Examples of such magnetic materials include but are not limited to soft magnetic steel, powdered metals, laminated silicon, or combinations comprising at least one of the foregoing materials. Current flows through an excitation coil (not shown) when it is desirable to create a magnetic field.

As illustrated in FIG. 1, the aligned groups of inner and outer pole teeth 22, 32 of magnetic actuator 10 are arranged in two different designs, i.e., design 1 and design 2. It is understood that although FIG. 1 depicts two design groups for the inner and outer pole teeth 22, 32, the actuator 10 is not limited to only two designs groups and may have one design group or more than two design groups. FIG. 1 illustrates one exemplary embodiment in which design 1 includes an angular spacing 23 and 33 between two teeth that is larger in size than the angular spacing between the two teeth in design 2. This angular spacing may be varied to satisfy a desired designed torque specification.

Figure 2:
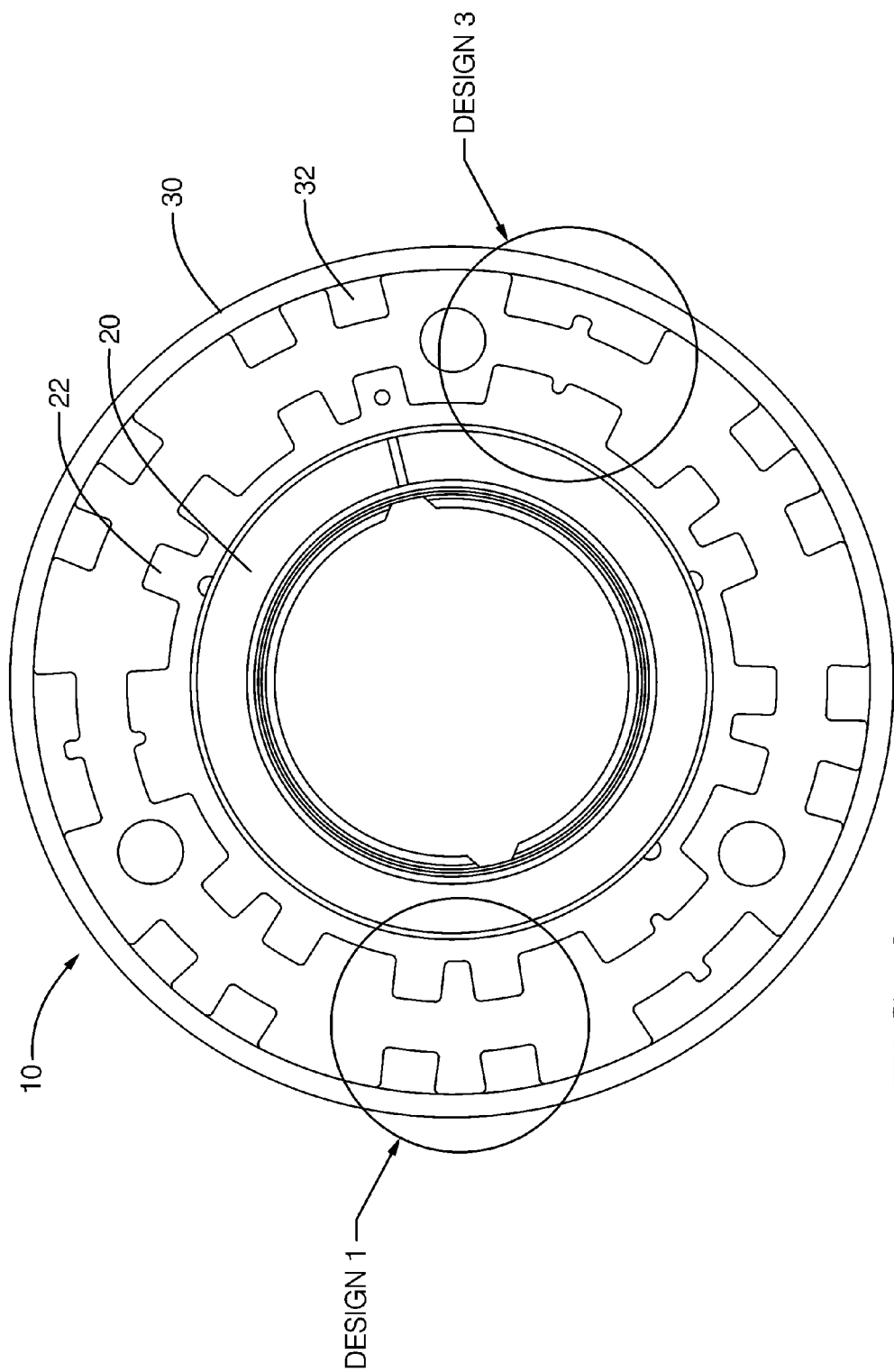
FIG. 2 is a top plan view of another embodiment of a magnetic actuator.
Figure 3:
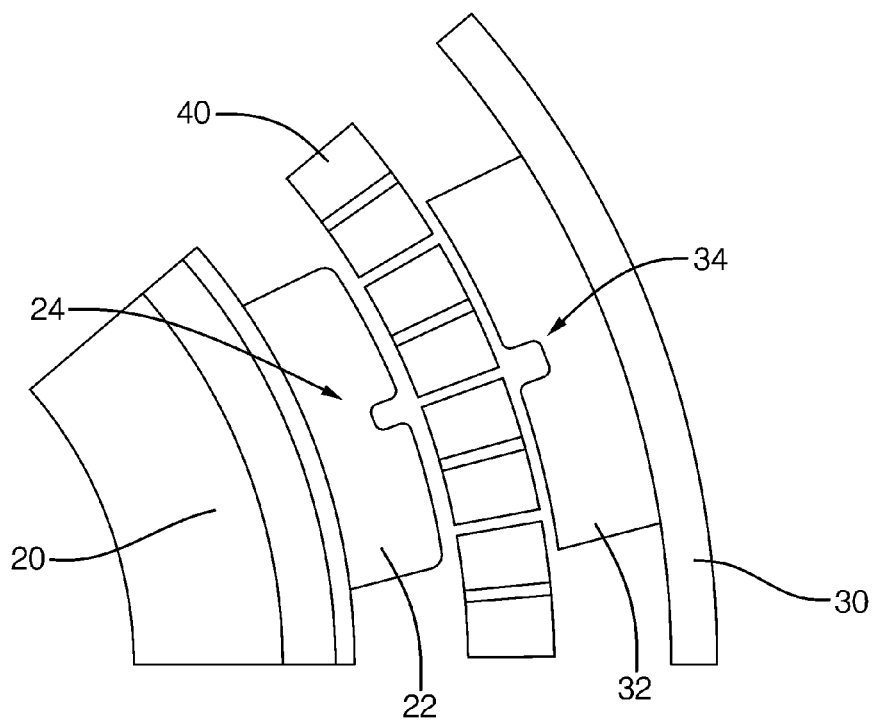
FIG. 3 is a top plan view of one tooth deign of the magnetic actuator shown in FIG. 2.

In an alternative embodiment depicted in FIG. 2, the teeth arranged according to design 2 can instead be arranged in accordance with design 3. This particular tooth design includes a single tooth having a dummy groove or notch near the middle of its upper surface. This tooth design is useful when the diameter of the magnetic actuator is decreased to a dimension so small that including angular spacing between the teeth in design 2 becomes impractical. Tooth design 3 is more clearly illustrated in FIGS. 2 and 3. As shown, a groove 24 is formed in the outer surface of each inner pole tooth 22, and a groove 34 is formed in the inner surface of each outer pole tooth 32. FIGS. 2 and 3 also show the magnetic ring 40 as it is positioned between inner pole teeth 22 and outer pole teeth 32. The grooves 24 and 34 can vary in size and in shape. For example, they can be U-shaped as shown or semi-circular shaped. The outer groove 34 is shown as being larger than the inner groove 24; however, it is understood that the grooves could also be very similar in size.

The magnetic ring 40 is defined herein as a ring made of a single annular magnet or as a ring made of several discrete magnets arranged radially around the inner ring 20. The discrete magnets are arc or flat shaped (e.g., rectangular, square, etc.). The magnetic ring 40 includes a permanent magnetic material. A "permanent" magnetic material exhibits magnetism even when no electrical current is applied. Examples of suitable permanent magnetic materials include but are not limited to alloys such as NdFeB, SmCo, and AlNiCo, composite materials such as AlNiCo in a plastic, and combinations comprising at least one of the foregoing materials.

Figure 4:
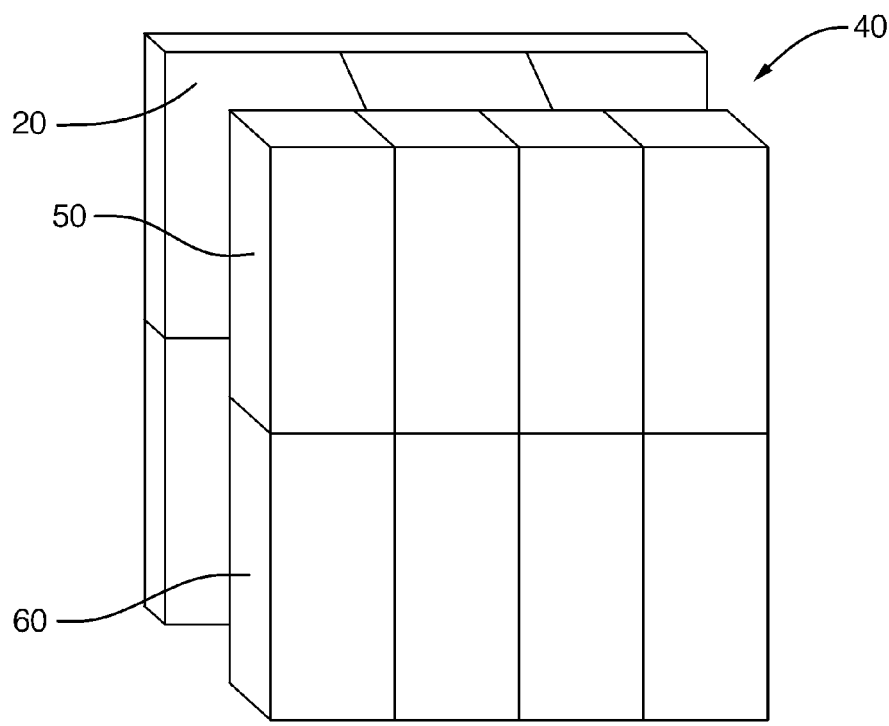
FIG. 4 is a perspective view of a section of the magnetic actuator illustrating a design of the actuator's magnets.

In another exemplary embodiment depicted in FIG. 4, the magnetic ring 40 includes an upper set of magnets 50 and a lower set of magnets 60. The particular arrangement of these magnets are used in conjunction with the tooth designs described above to achieve a desired torque. As shown, the magnets are distributed in pole pairs symmetrically. Different pole pairs alternate around the top row of magnetic ring 40 that are offset from similar pole pairs in the bottom row. The ratio of the number of teeth in each ring to the number of magnetic poles in each row is a predetermined definite amount. For example, the tooth to pole ratio can be about 1. In one embodiment, the upper magnets 50 are different in width from the lower magnets 60. It is understood that the magnet configuration described herein is not intended to be limiting, for other designs of the magnet poles are contemplated. For example, rather than being arranged in pairs, the magnets could be arranged in groups of more than two or as separate magnets not in groups.

As used herein, the terms "a" and "an" do not denote a limitation of quantity, but rather denote the presence of at least one of the referenced item. Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

While the present disclosure has been described with reference to the exemplary embodiments, it will be understood by those skilled in the art that various changes may be made and equivalents may be substituted for elements thereof without departing from the scope. In addition, many modifications may be made to adapt a particular situation or material to the teachings of the present disclosure without departing from the essential scope thereof. Therefore, it is intended that the present disclosure not be limited to the particular exemplary embodiments disclosed as the best mode contemplated for carrying out the exemplary embodiments.

What is claimed is:

1. A magnetic actuator, comprising:
   an inner ring;
   an outer ring disposed around the inner ring;
   a magnetic ring comprising a permanent magnetic material, disposed between the inner ring and the outer ring;
   an excitation coil capable of generating magnetic flux through the inner and outer rings when current is applied thereto;
   a plurality of inner teeth disposed on the inner ring arranged in a plurality of pairs, each pair being circumferentially spaced apart from other pairs along the inner ring;
   a notched inner tooth disposed on the inner ring that includes a first notch partially defined by the notched tooth;
   a plurality of outer teeth disposed on the outer ring arranged in a plurality of pairs, each pair being circumferentially spaced apart from other pairs along the outer ring;
   a notched outer tooth disposed on the outer ring that includes a second notch partially defined by the notched outer tooth, wherein the inner ring, the first pair of inner teeth and third tooth on the inner ring, the outer ring, and the first pair of outer of outer teeth and fourth tooth on the outer ring conduct the magnetic flux generated by the excitation coil upon application of an electric current.

2. The actuator of claim 1, wherein the first pair of inner teeth has a tooth width of a first dimension and the third tooth has a tooth width of a second dimension.

3. The actuator of claim 2, wherein the first dimension is less than the second dimension.

4. The actuator of claim 1, wherein the first pair of outer teeth have a tooth width of a third dimension.

5. The actuator of claim 1, wherein the fourth tooth has a tooth width of a fourth dimension.

6. The actuator of claim 1, wherein the first notch has a first notch dimension.

7. The actuator of claim 1, wherein the second notch has a second notch dimension.

8. The actuator of claim 1, wherein the first notch has a first notch dimension less than a second notch dimension of the second notch.

9. A power steering assembly comprising a valve spool of a proportional hydraulic control valve connected to a steering wheel, a valve body of the proportional hydraulic control valve connected to wheels of a vehicle, and the magnetic actuator of claim 1 wherein the magnetic ring of the actuator is attached to the valve spool.

10. The actuator of claim 1, comprising a plurality of notched inner teeth on the inner ring and a plurality of notched outer teeth on the outer ring.

11. The actuator of claim 1, wherein the inner ring and the outer ring are symmetrically configured with respect to one another such that each pair of teeth on the inner ring has a corresponding pair of teeth on the outer ring, and each notched inner tooth on the inner ring has a corresponding notched outer tooth on the outer ring.

* * * * *